United States Patent [19]
Aki

[11] Patent Number: 5,583,845
[45] Date of Patent: Dec. 10, 1996

[54] GLASS BLANK DISC CENTERING DEVICE

[75] Inventor: Yuichi Aki, Tokyo, Japan

[73] Assignee: Sony Corporation, Tokyo, Japan

[21] Appl. No.: 389,945

[22] Filed: Feb. 17, 1995

[30] Foreign Application Priority Data

Feb. 25, 1994 [JP] Japan .................................. 6-052772

[51] Int. Cl.$^6$ .................................................. G11B 17/04
[52] U.S. Cl. .................................................. 369/270
[58] Field of Search .................................. 369/270, 271, 369/75.2, 77.1, 99.02, 99.06

[56] References Cited

FOREIGN PATENT DOCUMENTS

| 61-206956 | 9/1986 | Japan . |
| 64-210240 | 8/1989 | Japan . |
| 1-217760 | 8/1989 | Japan . |
| 4-038764 | 2/1992 | Japan . |
| 5-028541 | 2/1993 | Japan . |

Primary Examiner—John H. Wolff
Assistant Examiner—George J. Letscher
Attorney, Agent, or Firm—Ronald P. Kananen

[57] ABSTRACT

A glass blank disc centering device for use in an optical disc glass blank disc exposure apparatus so centering a glass blank disc that the center of the glass blank disc coincides with the rotational center of a turntable has a simple and low-cost construction and enables centering to be carried out rapidly and with high precision without rotating the turntable. A centering device 20 is so constituted that the pivoting of link arms 22, 23 and 24 about pivot shafts 21a, 21b and 21c causes guide rollers 27, 28 and 29 to all move in the same direction and through the same distance with respect to the rotational center of a turntable 16 and abut with the outer circumferential periphery of a glass blank disc placed on the turntable 16.

16 Claims, 4 Drawing Sheets

GLASS BLANK DISC CENTERING DEVICE

BACKGROUND OF THE INVENTION

This invention relates to a glass blank disc centering device for an optical disc glass blank disc exposure apparatus that centers a glass blank disc to be made into an optical disc master disc so that the center of the glass blank disc coincides with the rotational center of a turntable.

Conventionally, in an optical disc glass blank disc exposure apparatus, when the center of a glass blank disc to be made into an optical disc master disc is not aligned with the rotational center of the turntable, dynamic unbalance causes vibration during rotary recording on this glass bank disc. As a result, the track pitch and recording precision of the track recorded on the glass blank disc decreases.

There is a method of avoiding this problem wherein a center hole is provided passing through the center of the glass blank disc and the glass blank disc is centered by fitting a center pin provided on the turntable into this center hole. However, with this method, in order to achieve high-precision centering, it is necessary that the concentricity of the center hole and the outer cylinder of the glass blank disc and the dimensional precision of the center hole be high. Consequently, there has been the problem that the glass blank disc is expensive.

Also, when a center hole is provided in the glass blank disc, in uniformly spin-coating photoresist on the glass blank disc, in carrying out wet processing such as developing after exposure, and in regrinding the glass blank disc during recycling thereof, the center hole tends to cause problems such as deterioration in surface precision due to chemical residue and surface discontinuity; and therefore it is preferable that there be no center hole.

Furthermore, when the above-mentioned center hole is provided, if there are defects such as fine cracks in the center hole, centrifugal force during rotation of the glass blank disc may cause these to develop into substantial cracks and there is a danger that in some cases the glass blank disc will break up and fly apart.

Thus, there are various problems associated with centering using a center hole provided in the glass blank disc, and consequently, in practice, this method is not used much.

Centering of the glass blank disc can also be carried out using the outer cylinder of the glass blank disc, by the glass blank disc being retained on the turntable by the outer cylinder of the glass blank disc being retained all around its circumference by means of a ring or in at least three locations by means of guide rollers.

However, with this method, because it necessitates a rotating part larger than the glass blank disc, there has been the problem that compared to when a center hole is used, the centering mechanism is much larger and the cost of machining its constituent parts to a high precision is higher. Also, when an angular ring is provided around the periphery of the turntable, there has been the problem that fitting and removal of the glass blank disc are troublesome and there is a greater risk of scratching or otherwise damaging the recording surface of the glass blank disc.

When the above-mentioned guide rollers are provided or when a ring with a cutaway portion is provided so that fingers or claws of a jig can more easily reach the recording rear surface of the glass blank disc, because the balance of the turntable itself is consequently impaired, there has been the problem that correction of the balance of the turntable itself is necessary. Moreover, because its shape becomes discontinuous it greatly disturbs the surrounding airflow during high speed rotation, noise and windage loss increase. Consequently the accuracy of the speed of rotation falls.

Recently, optical discs and the like of higher density and higher speed accessibility have been being produced, and high speed rotation is becoming required also during recording on glass blank discs. Here, the acceleration of the vibration occurring due to dynamic unbalance of the glass blank disc is proportional to the square of the rotational speed. Consequently, with the same centering accuracy as in the past, the vibrational acceleration increases in proportion with the square of the conventional acceleration.

As a result the influence of vibrational acceleration becomes extremely large, and recording accuracy decreases markedly. Also, there have been problems such as that because the vibration frequency also increases in proportion to the rotational speed, when the inherent vibration frequencies of the various parts of the glass blank disc exposure apparatus and the frequency at which the glass blank disc is vibrating coincide, resonance causes the vibration to increase.

Because countermeasures such as making the various parts of the exposure apparatus more rigid than in the past consequently become necessary, there have been problems such as that the cost of the exposure apparatus itself increases.

Another method of suppressing vibration caused by resonance is to suppress the displacement due to vibrational acceleration caused by dynamic unbalance of the glass blank disc to a level such that it does not contribute to deterioration of the track pitch and recording precision by making the base of the apparatus, on which the turntable is mounted, amply heavy. However, with this approach, there are problems such as that increasing the weight of the apparatus tends to place limitations on where it can be installed and makes it difficult to make the apparatus compact. Moreover, material costs also increase.

Consequently, an operation of so centering the glass blank disc from outside that the center of the outer cylinder of the glass blank disc coincides as closely as possible with the rotational center of the turntable is necessary, and the methods described below are employed for this.

A first method is one in which an operator placing a glass blank disc on the turntable sets a displacement gauge such as a dial gauge or an electronic micrometer or the like against the outer cylinder edge surface of the glass blank disc and while rotating the glass blank disc on the turntable so finely adjusts the position of the glass blank disc that its eccentricity is reduced to a minimum or to within a tolerable range.

A second method is one in which when the glass blank disc is placed on the turntable the eccentricity of the glass blank disc is reduced to within a fixed allowable range using a jig or the like, the turntable is rotated at a predetermined speed, the unbalance of the glass blank disc is detected using a balance tester or a dynamic balancer or the like which detects the size and direction of the vibration caused by the dynamic unbalance, and balancing weights are attached or the position of the glass blank disc is adjusted.

However, in both these two methods, the work involved takes time and a skilled specialist operator is required. Also, because a person is present, there have been problems such as that dust from the person alights on the recording surface of the glass blank disc and defects arise in the recorded signal recorded on the glass blank disc.

Also, in the second method there has been the problem that generally, because detection of acceleration generally is of poorer resolution than detection of displacement, to obtain the same resolution as obtained with displacement detection, an expensive detecting instrument is necessary.

To overcome these problems, the methods described below have been disclosed.

First, there are methods such as those disclosed in Japanese Laid-Open Patent Publications No. S.61-206956, No. H.1-210240 and No. H.1-217760 wherein the above-mentioned first method is automated and the presence of the person is dispensed with.

However, in all these methods, the eccentricity is corrected and checked by the turntable being rotated through at least two revolutions at a relatively low speed. Consequently, there have been problems such as that the time required for centering is relatively long and that because a displacement measuring part, a driving part and a controlling part are necessary, to perform high-precision centering complex and expensive equipment is required.

There is another method, disclosed in Japanese Laid-Open Patent Publication No. H.4-387640, wherein the glass blank disc is moved into position from at least three directions simultaneously or sequentially without the turntable being rotated.

However, with this method, as well as the problem remaining that a displacement measuring part, s driving part and a controlling part are necessary and to perform high-precision centering complex and expensive equipment is required, there is also the problem that because the glass blank disc is moved into position according to calculations, the centering operation takes time.

On the other hand, in Japanese Laid-Open Patent Publication No. H.5-28541 and elsewhere, a method has been proposed wherein a mechanism of a type typified by a scroll-type three-clawed chuck used to fit a workpiece to a lathe major axis table of a machine tool or to fit a drill bit to a boring plate is applied. In this method, centering is completed in an instant without the turntable being rotated by the position of the glass blank disc being simultaneously adjusted from three directions. Also, because no displacement measuring part is necessary, the constitution of the centering apparatus can be made simpler than in the methods mentioned above.

However, in this kind of method, to carry out high-precision centering, there is a one-to-one correspondence relationship between the precision of the various members and the eccentricity; that is, high concentricity of the rotational center of adjusting members and a driving rotary table and guide rollers is required.

Furthermore, similarly high precision is required for guide grooves in three or more adjusting members which are provided. Consequently, there has been the problem that increasing the precision of the apparatus overall has meant increasing its cost.

SUMMARY OF THE INVENTION

This invention was devised in view of the points discussed above, and an object of the invention is to provide a glass blank disc centering device having a simple and low cost constitution and with which centering can be carried out rapidly and with high precision without the turntable being rotated.

According to the invention, the above object and other objects are achieved by a glass blank disc centering device comprising: a base plate disposed around a turntable on which is placed an optical disc glass blank disc; at least three link arms pivotally mounted on pivot shafts provided on the base plate with uniform angular spacing with respect to the rotational center of the turntable; connecting rods for connecting together adjacent link arms; and guide rollers mounted on the link arms, wherein pivoting of the link arms about the pivot shafts causes all the guide rollers to move in the same direction through the same distance with respect to the rotational center of the turntable and abut with the outer circumferential periphery of the glass blank disc placed on the turntable.

In a glass blank disc centering device according to the invention, the guide rollers are preferably nearer to the pivot shafts than the connecting rods are.

In a glass blank disc centering device according to the invention, the guide rollers preferably each comprise a member having a rotatable outer ring.

In a glass blank disc centering device according to the invention, preferably there is provided driving means connected via pivot shafts to at least one link arm and to the base plate for causing that link arm to pivot.

In a glass blank disc centering device according to the invention, the driving means is preferably a direct-acting drive device such as an air cylinder and a driving part thereof is slidably supported by a pivot shaft and also connected thereto by way of an elastic member.

In a glass blank disc centering device according to the invention, preferably, with a glass blank disc so centered on the turntable that the center of the outer circumferential circle of the glass blank disc coincides with the rotational center of the turntable, suction-held on the turntable the base plate is so positionally adjusted and fixed that when the link arms are caused to pivot, all the guide rollers abut with the outer circumferential edge of the glass blank disc.

Also, according to the invention, the above and other objects are achieved by a glass blank disc centering device comprising: a base plate disposed around a turntable on which is placed an optical disc glass blank disc; at least three link arms pivotally mounted on pivot shafts provided on the base plate with uniform angular spacing with respect to the rotational center of the turntable; connecting rods for connecting together adjacent link arms; guide rollers mounted on the link arms; and driving means connected via pivot shafts to at least one link arm and to the base plate for causing that link arm to pivot, wherein the link arms being caused by the driving means to pivot about the pivot shafts causes the guide rollers all to move in the same direction through the same distance with respect to the rotational center of the turntable and abut with the outer circumferential periphery of the glass blank disc placed on the turntable.

According to the constitution described above, by means of a link mechanism made up of link arms and connecting rods connecting these link arms together, guide rollers mounted on the link arms are all caused to move in the same direction through the same distance with respect to the rotational center of a turntable. The movement of the guide rollers caused by the pivoting of the link arms causes the guide rollers to abut with the outer circumferential edge of a glass blank disc placed on the turntable. As a result, the glass blank disc is centered by all the guide rollers abutting with the outer circumferential edge of the glass blank disc after the glass blank disc is so moved on the turntable that the center of its outer circumferential edge is brought to coincide with the rotational center of the turntable.

When the guide rollers are nearer to the pivot shafts than the connecting rods are, influences of fluctuations in the lengths of the connecting rods due to looseness between the connecting rods and the link arms and temperature changes and stress fluctuations and the like are scaled down as they are transmitted as link arm pivoting error before becoming guide roller movement error.

When the guide rollers each comprise a member having a rotatable outer ring, when the guide rollers are in abutment with the outer circumferential edge of a glass blank disc on the turntable, slowly rotating the glass blank disc will cause the guide rollers to rotate. Thus, the abutment of the guide rollers with the outer circumferential edge of the glass blank disc is confirmed by the rotation of the guide rollers.

When there is provided driving means connected via pivot shafts to at least one link arm and to the base plate for causing that link arm to pivot, operating the driving means causes the link arms to simultaneously pivot in the same direction through the same angle.

When the driving means is a direct-acting drive device such as an air cylinder and a driving part thereof is slidably supported by a pivot shaft and also connected thereto by way of an elastic member, when the driving part is caused to move by the operation of the direct-acting drive device, the movement of the driving part is not directly transmitted to the link arm but rather is transmitted through the spring member. As a result, excessive loads are prevented from acting on the connecting rods and the pivot shafts, etc.

When with a glass blank disc so centered on the turntable that the center of the outer circumferential circle of the glass blank disc coincides with the rotational center of the turntable suction-held on the turntable, the base plate is so positionally adjusted and fixed that when the link arms are caused to pivot, all the guide rollers abut with the outer circumferential edge of the glass blank disc, so adjustment of the centering device can be carried out easily and in a short time.

DETAILED DESCRIPTION OF THE PREFERRED EMBODIMENTS

A preferred embodiment of the invention will now be described in detail with reference to FIG. 1 through FIG. 4.

Because the embodiments described below are preferred specific examples of embodiments of the invention, various technically preferable limitations are attached thereto; however, except where specifically stated otherwise in the following description, the scope of the invention is not limited to these embodiments.

Figure 1:
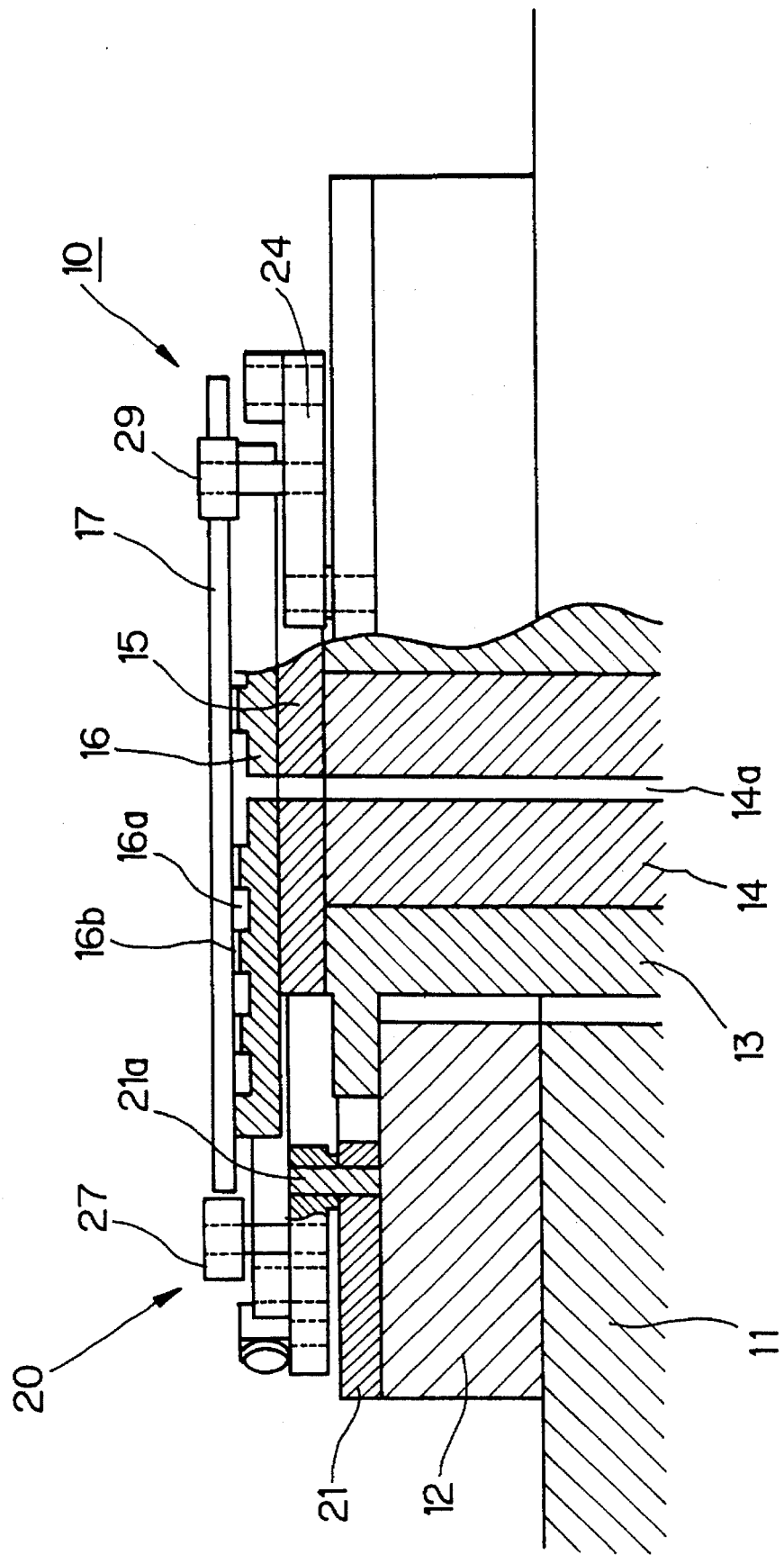
FIG. 1 is a partially sectional view of a preferred embodiment of a centering device according to the invention.

FIG. 1 shows the vicinity of an air spindle turntable of a glass blank disc exposure apparatus incorporating a preferred embodiment of a centering device according to the invention. In FIG. 1, the glass blank disc exposure apparatus 10 comprises a base 11, a spindle base 12 for height correction mounted on this base 11, an air spindle housing 13 mounted on this spindle base 12, a rotary shaft 14 loosely fitted in a hollow portion passing vertically through this air spindle housing 13 so that a film of air is sandwiched between the air spindle housing 13 and the rotary shaft 14, a circular platelike thrust plate 15, fixed to the upper end of this rotary shaft 14, which restricts movement in the axial direction and has a suitable air film form thereunder, and a turntable 16 fixed to the top of this thrust plate 15.

The base 11 and the spindle base 12 are integrally fixed to each other in this preferred embodiment but may alternatively consist of a single member.

The rotary shaft 14, the thrust plate 15 and the turntable 16 are rotationally driven integrally by drive means such as a drive motor not shown in the drawings. Here, the rotary shaft 14 and the thrust plate 15, or the thrust plate 15 and the turntable 16, or the rotary shaft 14, the thrust plate 15 and the turntable 16 may alternatively consist of one member.

The turntable 16 has a glass blank disc 17 placed on the upper surface thereof, and this upper surface is provided with at least one annular groove 16a extending in the circumferential direction and a radial groove 16b which connects the annular grooves 16a together.

A fluid passage 14a is provided in the rotary shaft 14, and vacuum air discharge is carried out through this fluid passage 14a. By air being vacuum discharged from the space bounded by the underside of the glass blank disc 17 placed on the turntable 16 and the grooves 16a and 16b formed on the turntable 16 through the fluid passage 14a, this glass blank disc 17 is vacuum-sucked onto the upper surface of the turntable 16.

Here, the annular grooves 16a and the radial groove 16b are so formed with suitable groove widths and spacing that when this glass blank disc 17 is sucked onto the turntable 16 by vacuum negative pressure, the recording surface on the underside of this glass blank disc 17 is only deformed to an extent such that this deformation does not have an adverse effect on the recording precision during rotary recording, and so that such a static frictional force is obtained that the glass blank disc 17 does not slide off the top of the turntable 16 under centrifugal force during rotation due to residual eccentricity.

Also, the depths of these grooves 16a and 16b are so suitably fixed that the volume of the space bounded by these grooves 16a and 16b and the glass blank disc 17 moderates the sudden pressure change occurring when vacuum air discharge starts and the formation of microcracks due to displacement of and shock to the glass blank disc 17 caused by pulsations caused by the vacuum air discharge is prevented.

The constitution described above is the same as that of the turntable vicinity in a conventional glass blank disc exposure apparatus; however, in the glass blank disc exposure apparatus 10 shown in FIG. 1, there is further provided a centering device 20 described below.

In this preferred embodiment, the centering device 20 comprises a base plate 21 mounted around the periphery of the turntable 16, link arms 22, 23 and 24 pivotally mounted on at least three (in the drawings, 3) pivot shafts 21b 21b and 21c mounted on this base plate 21, two connecting rods 25 and 26 which connect the adjacent link arms 22, 23 and 24, guide rollers 27, 28 and 29 mounted on the link arms 22, 23 and 24 respectively, and a driving air cylinder 30 connected to the link arm 22.

Figure 2:
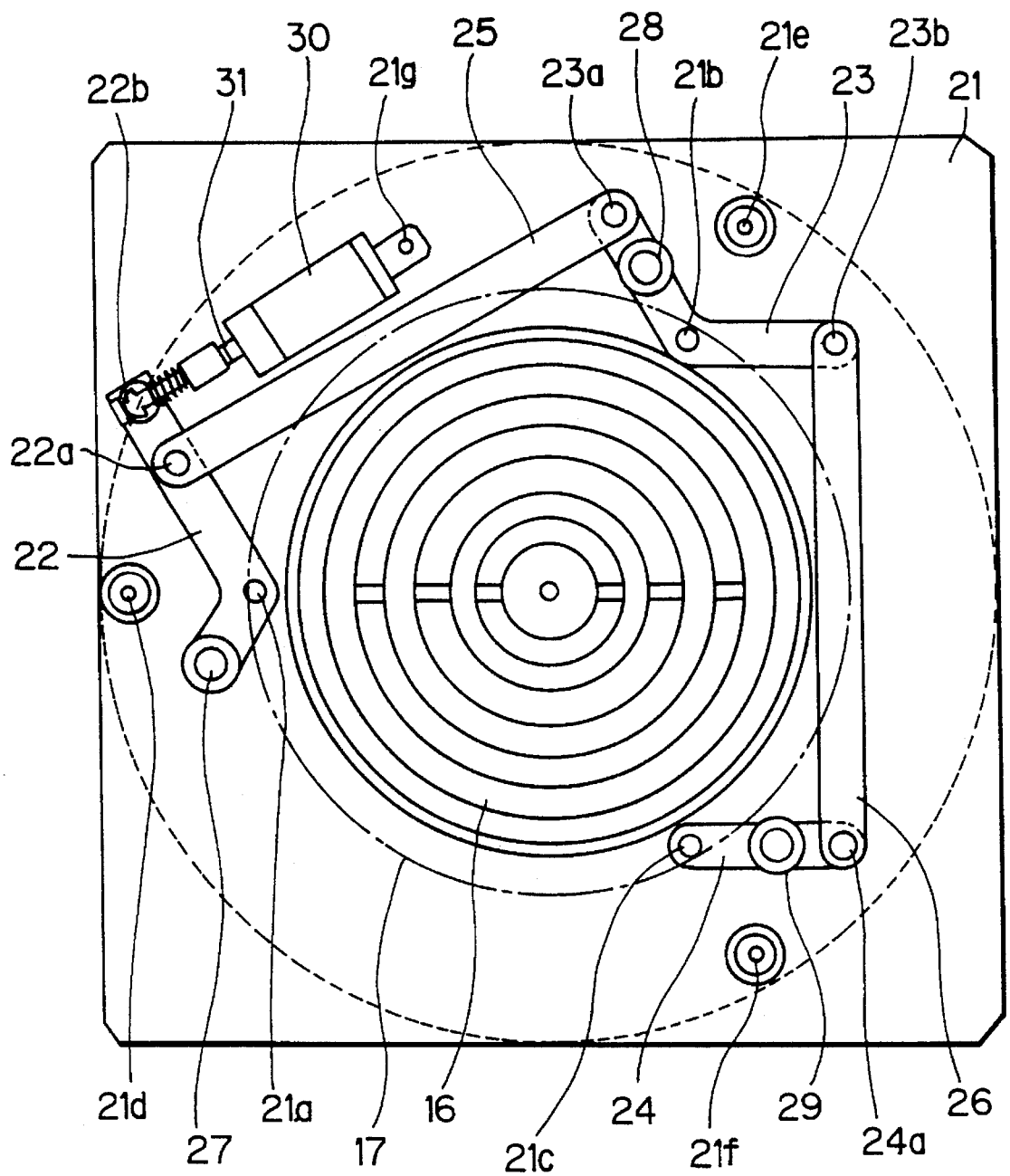
FIG. 2 is a plan view of the centering device shown in FIG. 1 in a disengaged state.

The base plate 21 is fixed to the base 11 or the spindle base 12 by means of three screws 21d, 21e and 21f as shown in FIG. 2.

The link arms 22, 23 and 24 are provided with pivot shafts 22a, 23a, 23b and 24a disposed a fixed distance from the respective pivot shafts 21a, 21b and 21c, and the ends of the connecting rods 25 and 26 are pivotally mounted on the respective pivot shafts 22a, 23a, 23b and 24a. Here, the length of the connecting rods 25 and 26 is the same as the distance between the pivot shafts 21a and 21b and the distance between the pivot shafts 21b and 21c.

The guide rollers 27, 28 and 29 are all disposed the same distance from the respective pivot shafts 21a, 21b and 21c. As a result, for example when the link arm 22 is caused to pivot around the pivot shaft 21a, the pivoting of this link arm 22 is transmitted through the connecting rod 25 to the link arm 23 and through the connecting rod 26 to the link arm 24.

Thus the link arms 22, 23 and 24 all pivot in the same direction and through the same angle, and the guide rollers 27, 28 and 29 mounted on the link arms 22, 23 and 24 are so guided that they are all equidistant from the rotational center of the turntable 16.

Here, the pivot shafts 21a, 21b and 21c are preferably disposed with uniform angular spacing with respect to the rotational center of the turntable 16, i.e. with an angular spacing of 120°. The guide rollers 27, 28 and 29 are thereby held with higher precision in uniform positions with respect to the rotational center of the turntable 16 by the pivoting in unison of the interconnected link arms 22, 23 and 24.

Also, similarly, it is desirable that the distances of the guide rollers 27, 28 and 29 from the pivot shafts 21a, 21b and 21c on the base plate 21, the distances between the pivot shafts 22a, 23a, 23b and 24a, which support the connecting rods 25 and 26, and the pivot shafts 21a, 21b and 21c, the angles between the link arms 22, 23 and 24 and the connecting rods 25 and 26, and the lengths of the connecting rods 25 and 26 (i.e. the distances between the pivot shafts 22a and 23a and the pivot shafts 23b and 24a) be made as accurate as possible.

In the machining of these various members, by carrying out holemaking using an automatic numerically controlled machine tool or the like provided with a displacement gauge, generally, with a gauge resolution of 1 μm or less, that is, as the actual machining precision, in the precision of distances between hole centers, with a precision of 10 μm or less, machining can be carried out extremely easily.

Also, the pivoting radius of the guide rollers 27, 28 and 29, i.e. the distance between the guide rollers 27, 28 and 29 and the pivot shafts 21a, 21b and 21c, is preferably set shorter than the pivoting radius of the connecting rods 25 and 26, i.e. the distance between the pivot shafts 22a, 23a, 23b and 24a and the pivot shafts 21a, 21b and 21c.

This is in order that errors are reduced as far as possible by errors caused by fluctuations in the lengths of the connecting rods 25 and 26 caused by looseness of the pivot portions and temperature changes and stress fluctuations of the connecting rods 25 and 26 being scaled down as they are transmitted as errors of the pivoting angles of the guide rollers 27, 28 and 29.

Figure 4:
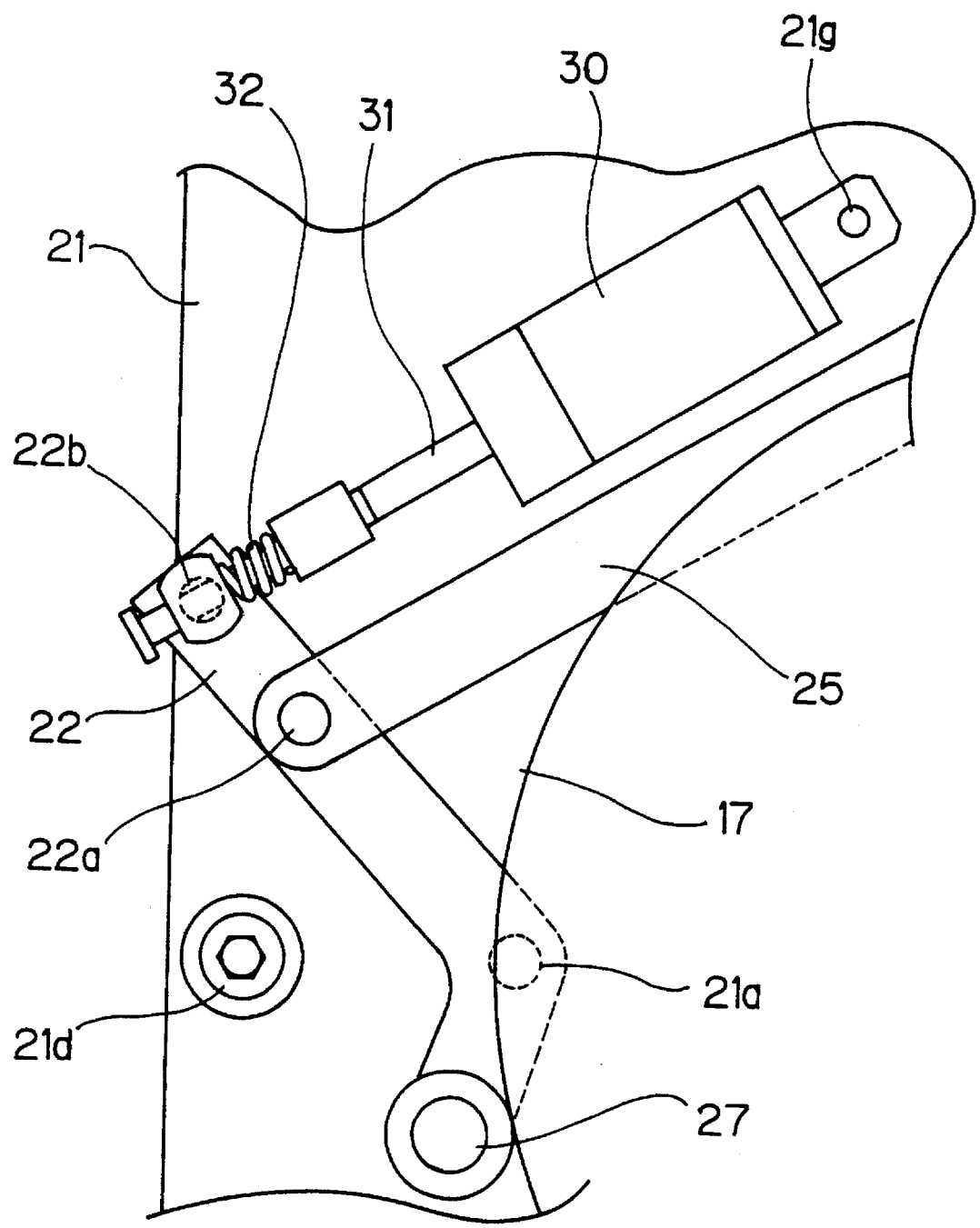
FIG. 4 is an enlarged partial plan view of a drive part of the centering device of FIG. 3.

The driving air cylinder 30 is pivotally mounted on the base plate 21 and the link arm 22 by way of pivot shafts 21g and 22b respectively, as shown in FIG. 2 and shown in greater detail in FIG. 4.

In this preferred embodiment the glass blank disc exposure apparatus 10 and the centering device 20 are constituted as described above, and in FIG. 2 the direct-acting movable shaft 31 of this driving air cylinder 30 is in its most retracted position. Consequently, in the drawings, the link arms 22, 23 and 24 are in a clockwise-rotated, disengaged state.

From this disengaged state, after a glass blank disc 17 has been placed on the turntable 16, the driving air cylinder 30 is operated and the direct-acting movable shaft 31 thereof is caused to move to its most extended position.

As a result, the link arm 22 is pivoted counterclockwise in FIG. 2 about the pivot shaft 21a. At this time, the pivoting of the link arm 22 is transmitted through the connecting rod 25 to the link arm 23 and through the connecting rod 26 to the link arm 24.

Figure 3:
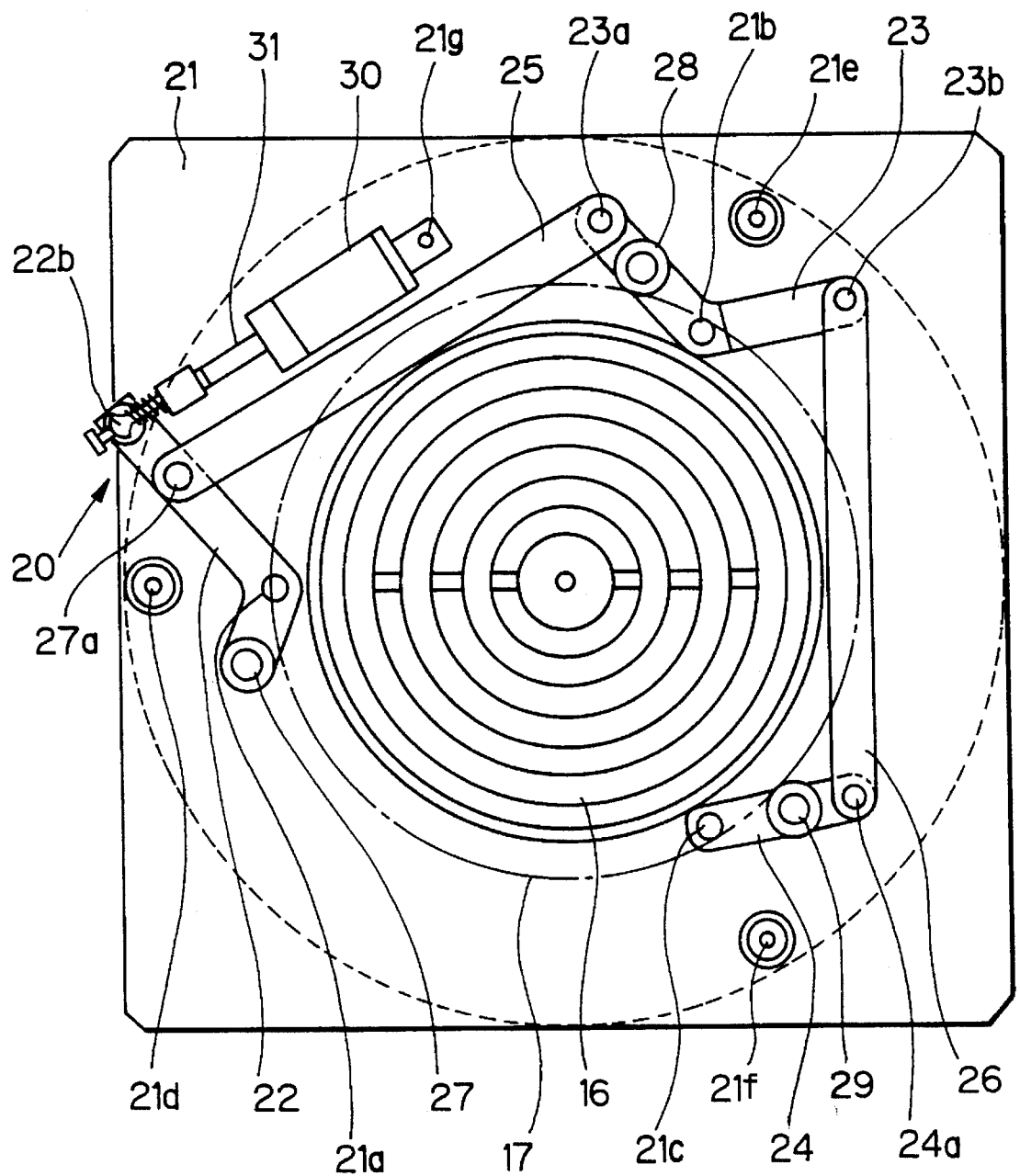
FIG. 3 is a plan view of the centering device shown in FIG. 1 in a centering operation state.

The link arms 22, 23 and 24 are thereby all pivoted in the same direction (counterclockwise) through the same angle and brought to a centering state shown in FIG. 3 and FIG. 4.

Thus the guide rollers 27, 28 and 29 mounted on the link arms 22, 23 and 24 all approach the rotational center of the turntable 16 while remaining equidistant therefrom. While doing so, the guide rollers 27, 28 and 29 abut with and push the outer circumferential edge of the glass blank disc 17 placed on the turntable 16.

This causes the outer circumferential edge of the glass blank disc 17 with which the guide rollers 27, 28 and 29 abut to so move on the turntable 16 and be constrained that all points thereon become equidistant from the rotational center of the turntable 16, i.e. so that the center of this glass blank disc 17 comes to coincide with the rotational center of the turntable 16.

For this to happen, it is necessary that the centering device 20 be so adjusted in the state in which it is shown in FIG. 3 and FIG. 4 that the center of the glass blank disc 17 is indeed brought to coincide with the rotational center of the turntable 16 in the process described above.

In this adjustment operation, first, a displacement gauge such as a dial gauge or an electronic micrometer is set on the outer cylinder edge surface of the glass blank disc 17.

Next, while being rotated, the glass blank disc 17 on the turntable 16 is so centered that the eccentricity of this glass blank disc 17 is minimized to approximately the same precision as the circularity of its outer cylindrical edge surface, i.e. so that the center of the outer cylinder edge surface of the glass blank disc 17 coincides with the rotational center of the turntable 16, and is vacuum-sucked onto the turntable 16.

Then, with the glass blank disc 17 in this state and the screws 21d, 21e and 21f loosened, after centering of the glass blank disc 17 has been performed, the driving air cylinder 30 is operated and the base plate 21 is so moved with respect to the base 11 that the guide rollers 27, 28 and 29 uniformly abut with the outer circumferential edge of the glass blank disc 17.

By lastly tightening the screws 21d, 21e and 21f, positioning adjustment can be carried out easily and in a short time.

If the guide rollers 27, 28 and 29 consist of members with rotatable outer rings such as cam followers, when the turntable 16 is rotated, if the guide rollers 27, 28 and 29 are in abutment with the glass blank disc 17 they will rotate, and if they are not in abutment therewith they will not rotate.

Therefore, if it is confirmed that these guide rollers 27, 28 and 29 are rotating without sliding, it is thereby easily confirmed that the guide rollers 27, 28 and 29 are properly in abutment with the glass blank disc 17.

Therefore, if all the guide rollers 27, 28 and 29 rotate when the glass blank disc 17 is slowly rotated through one revolution or more after the base plate 21 is moved and if also when the glass blank disc 17 is then removed from the turntable 16 and replaced onto the turntable 16 again and vacuum-sucked onto the turntable 16 after being centered and the glass blank disc 17 is similarly slowly rotated again through one revolution or more all the guide rollers 27, 28 and 29 rotate again, it is thereby confirmed easily and with high precision that adjustment of the centering device 20 has been so performed that the center of the outer cylinder of the glass blank disc 17 coincides with the rotational center of the turntable 16.

When the driving air cylinder 30 operates, the direct-acting movable shaft 31 is driven by pneumatic pressure from outside the apparatus, and if the direct-acting movable shaft 31 moves too fast, when the guide rollers 27, 28 and 29 abut with the outer circumferential edge of the glass blank disc 17 there is a danger of them impacting the glass blank disc 17 and damaging the parts of the glass blank disc 17 with which they abut. Therefore, it is preferable that the speed at which the direct-acting movable shaft 31 of the driving air cylinder 30 moves be limited by providing means for limiting the air flowrate such as a speed controller in the path through which air is supplied to the air cylinder 30.

On the other hand, if the pressure of the air supplied to the driving air cylinder 30 is not sufficient, there is a danger of the operating speed of the direct-acting movable shaft 31 becoming unstable. Therefore, it is necessary for a suitable pneumatic pressure such that low speed and yet stable operation can be obtained be supplied to the driving air cylinder 30.

As shown in FIG. 4, the direct-acting movable shaft 31 of the driving air cylinder 30 slidably passes through a horizontal through hole in the pivot shaft 22b of the link arm 22, and an elastic member 32 such as a compression coil spring is mounted between the direct-acting movable shaft 31 and the pivot shaft 22b. As a result, when the direct-acting movable shaft 31 has reached its most extended position, due to the action of this elastic member 32 the movement of the direct-acting movable shaft 31 is not transmitted directly to the link arm 22 but rather the elastic force of the elastic member 32 is transmitted to the pivot shaft 22b of the link arm 22.

Therefore, an excessive load being caused to act on the link arms 22, 23 and 24 and the connecting rods 25 and 26 and the pivot shafts by the advancing movement of the direct-acting movable shaft 31 is avoided, and consequent accidental deformation of the various members is prevented. As a result, the movement of the direct-acting movable shaft 31 of the driving air cylinder 30 is smoothly transmitted to the link arm 22, and high precision centering can be carried out. Here, by the elastic force of the elastic member 32 being suitably adjusted, an elastic force suitable for centering is provided.

Preferably, a flange 31a is provided on the end of the direct-acting movable shaft 31, and when the centering device 20 returns to the disengaged state from the centering state, this flange 31a engages with the link arm 22 and the link arm 22 is thereby forcibly pivoted clockwise and the other link arms 23 and 24 are also forcibly pivoted clockwise by way of the connecting rods 25 and 26.

In the preferred embodiment described above, a driving air cylinder 30 connected to one of the link arms, the link arm 22, is provided as means for driving the link arms 22, 23 and 24; however, the invention is not limited to this constitution and it is obvious that the other link arms 23 and 24, or the connecting rods 25 and 26 may alternatively be provided with driving means.

Also, although in this preferred embodiment the driving air cylinder 30 is used as the driving means, the invention is not limited to this constitution and it is clear that similar effects could be obtained by using some other linear drive mechanism or a rotary drive mechanism or by pivoting the link arms 22, 23 and 24 by hand. Also in cases when such other drive means is used, smooth transmission of the driving force can be effected by the driving force being similarly transmitted to the link arms 22, 23 and 24 through an elastic member. When a rotary drive mechanism is used, a torque adjustment mechanism such as for example a torque limiter may be provided to adjust the elastic force.

Thus, according to the preferred embodiment described above, centering of a glass blank disc 17 on a turntable can be performed by means of a link mechanism consisting of link arms and connecting rods connecting these link arms together. As a result, centering of substantially the same accuracy as that of the circularity of the outer cylinder of the glass blank disc is possible.

Therefore, even if the outer diameter dimensions of a plurality of glass blank discs differ within their tolerances, by guide rollers being caused by the pivoting of link arms to abut with the outer circumferential edges of the glass blank discs, centering of all the discs can be carried out with substantially the same accuracy.

When the distances of the guide rollers from the pivot shafts are made smaller than the distances of the connecting rods from the pivot shafts, because errors relating to the connecting rods are scaled down as they are transmitted to the guide rollers, the effects on centering precision of machining precision errors are reduced.

When the guide rollers consist of members with rotatable outer rings, the abutment of these guide rollers with the glass blank disc is easily confirmed by observation of the rotation of the guide rollers.

When driving means connected by way of pivot shafts is provided between at least one of the link arms and the base plate for causing this link arm to pivot, by operating this driving means, with a simple constitution, centering can be carried out easily.

When the driving means is a direct-acting drive device such as an air cylinder and the driving part thereof is supported slidably by a pivot shaft and elastically connected thereto by way of an elastic member, excessive loads are prevented from being exerted on the link arms, the connecting rods and the pivot shafts. As a result, high-precision centering can be carried out.

When with a glass blank disc so centered on the turntable that the center of the outer circumferential surface of the glass blank disc coincides with the rotational center of the turntable held on the turntable by vacuum suction the link arms are caused to pivot and the base plate is so positionally adjusted and fixed that the guide rollers are caused to abut with the outer circumferential edge of the glass blank disc, adjustment of the centering device can be carried out easily and in a short time. Therefore, even if the precision with which the various members are machined is not very high, centering precision of substantially the same level as the circularity of the outer circumferential edge of the glass blank disc can be obtained. Furthermore, because the directions of the loads at the time of position adjustment and centering adjustment are the same, high-precision centering adjustment is possible.

In this way, by causing link arms to pivot, high-precision centering can be carried out easily and in a short time. As a result, because the occurrence during rotational recording of dynamic unbalance due to eccentricity is kept extremely low and vibration is minimized, precision deterioration due to reduction in the track pitch precision of the track recorded on the glass blank disc is prevented, the precision of the recording on the glass blank disc of an optical disc or the like is improved, and the quality of the optical disc or the like is stable.

Furthermore, as described above, centering adjustment can be realized with a simple driving means and a simple constitution and easy machining by carrying out positional adjustment of the base plate after assembly.

According to the invention as described above, there is provided a glass blank disc centering device having a simple and low-cost constitution with which centering can be carried out rapidly and with high precision without rotating the turntable.

What is claimed is:

1. A glass blank disc centering device comprising:

a base plate disposed around a turntable on which is placed an optical disc glass blank disc;

at least three link arms pivotally mounted on pivot shafts provided on the base plate with uniform angular spacing with respect to the rotational center of the turntable;

connecting rods for connecting together adjacent link arms, wherein each connecting rod has the same length as the distance between two pivot shafts which respectively mount the adjacent link arms directly connected to that connecting rod;

guide rollers mounted on the link arms, wherein pivoting of the link arms about the pivot shafts causes all the guide rollers to move in the same direction through the same distance with respect to the rotational center of the turntable and abut with the outer circumferential periphery of the glass blank disc placed on the turntable;

wherein with the glass blank disc is so centered on the turntable that the center of the outer circumferential circle of the glass blank disc coincides with the rotational center of the turntable.

2. A glass blank disc centering device according to claim 1, wherein the guide rollers are located nearer to the pivot shafts than are the connecting rods.

3. A glass blank disc centering device according to claim 1, wherein the guide rollers each comprise a member having a rotatable outer ring.

4. A glass blank disc centering device according to claim 1, wherein driving means are connected via pivot shafts to at least one link arm and to the base plate for causing that link art to pivot.

5. A glass blank disc centering device according to claim 4, wherein the driving means is a direct-acting drive device such as an air cylinder and a driving part thereof is slidably supported by a pivot shaft and also connected thereto by way of an elastic member.

6. A glass blank disc centering device according to claim 1, wherein the glass blank disc is so centered on the turntable that the center of the outer circumferential circle of the glass blank disc coincides with the rotational center of the turntable held on the turntable by vacuum suction the base plate is so positionally adjusted and fixed that when the link arms are caused to pivot all the guide rollers abut with the outer circumferential edge of the glass blank disc.

7. A glass blank disc centering device comprising:

a base plate disposed around a turntable on which is placed an optical disc glass blank disc;

at least three link arms pivotally mounted on pivot shafts provided on the base plate with uniform angular spacing with respect to the rotational center of the turntable;

connecting rods for connecting together adjacent link arms, wherein each connecting rod has the same length as the distance between two pivot shits which respectively mount the adjacent link arms directly connected to that connecting rod;

guide rollers mounted on the link arms; and driving means connected via pivot shits to at least one link arm and to the base plate for causing that link arm to pivot, wherein the link arms being caused by the driving means to pivot about the pivot shits cause the guide rollers to all move in the same direction through the same distance with respect to the rotational center of the turntable and abut with the outer circumferential periphery of the glass blank disc placed on the turntable;

wherein the glass blank disc is so centered on the turntable that the center of the outer circumferential circle of the glass blank disc coincides with the rotational center of the turntable.

8. A glass blank disc centering device according to claim 7, wherein the guide rollers are nearer to the pivot shafts than the connecting rods are.

9. A glass blank disc centering device according to claim 7, wherein the guide rollers each comprise a member having a rotatable outer ring.

10. A glass blank disc centering device according to claim 7, wherein the driving means is a direct-acting drive device such as an air cylinder and a driving part thereof is slidably supported by a pivot shaft and also connected thereto by way of an elastic member.

11. A glass blank disc centering device according to claim 7, wherein the glass blank disc is so centered on the turntable that the center of the outer circumferential circle of the glass blank disc coincides with the rotational center of the turntable held on the turntable by vacuum suction the base plate is so positionally adjusted and fixed that when the link arms are caused to pivot all the guide rollers abut with the outer circumferential edge of the glass blank disc.

12. A glass blank disc centering device comprising:

a turntable;

a base plate disposed around said turntable;

an optical disc glass blank disc placed on said turntable;

at least three link arms pivotally mounted on pivot shafts provided on the base plate with substantially uniform angular spacing with respect to a rotational center of the turntable;

means, including connecting rods, for connecting together adjacent link arms, wherein each connecting rod has the same length as the distance between two pivot shafts which respectively, mount the adjacent link arms directly connected to that connecting rod;

guide rollers mounted on the link arms;

means for pivoting the link arms about the pivot shafts to cause all of the guide rollers to move in substantially the same direction through substantially the same distance with respect to the rotational center of the turntable and to abut with the outer circumferential periphery on the turntable;

driving means cooperating with said pivoting means and connected by way of the pivot shafts to an least one link arm and to the base plate for causing that link arm to pivot in such a manner that the link arms being caused by the driving means to pivot about the pivot shafts coact to cause the guide rollers all to move in the same direction through the same distance with respect to the rotational center of the turntable and to abut with the outer periphery of the glass blank disc on the turntable; and wherein the glass blank disc is so centered on the turntable that the center of the outer circumferential circle of the glass blank disc coincides with the rotational center of the turntable.

13. A glass blank disc centering device according to claim 12, wherein the guide rollers are nearer to the pivot shafts than the connecting rods are.

14. A glass blank disc centering device according to claim 12, wherein the guide rollers each comprise a member having a rotatable outer ring.

15. A glass blank disc centering device according to claim 12, wherein the driving means is a direct-acting drive device such as an air cylinder and a driving part thereof is slidably supported by a pivot shaft and also connected thereto by way of an elastic member.

16. A glass blank disc centering device according to claim 12, wherein with a glass blank disc so centered on the turntable that the center of the outer circumferential circle of the glass blank disc coincides with the rotational center of the turntable held on the turntable by vacuum suction the base plate is so positionally adjusted and fixed that when the link arms are caused to pivot all the guide rollers abut with the outer circumferential edge of the glass blank disc.

* * * * *